Aug. 18, 1970     W. F. KELLY     3,524,227
GRIPPING AND RELEASE ASSEMBLY
Filed Aug. 29, 1967     2 Sheets-Sheet 1
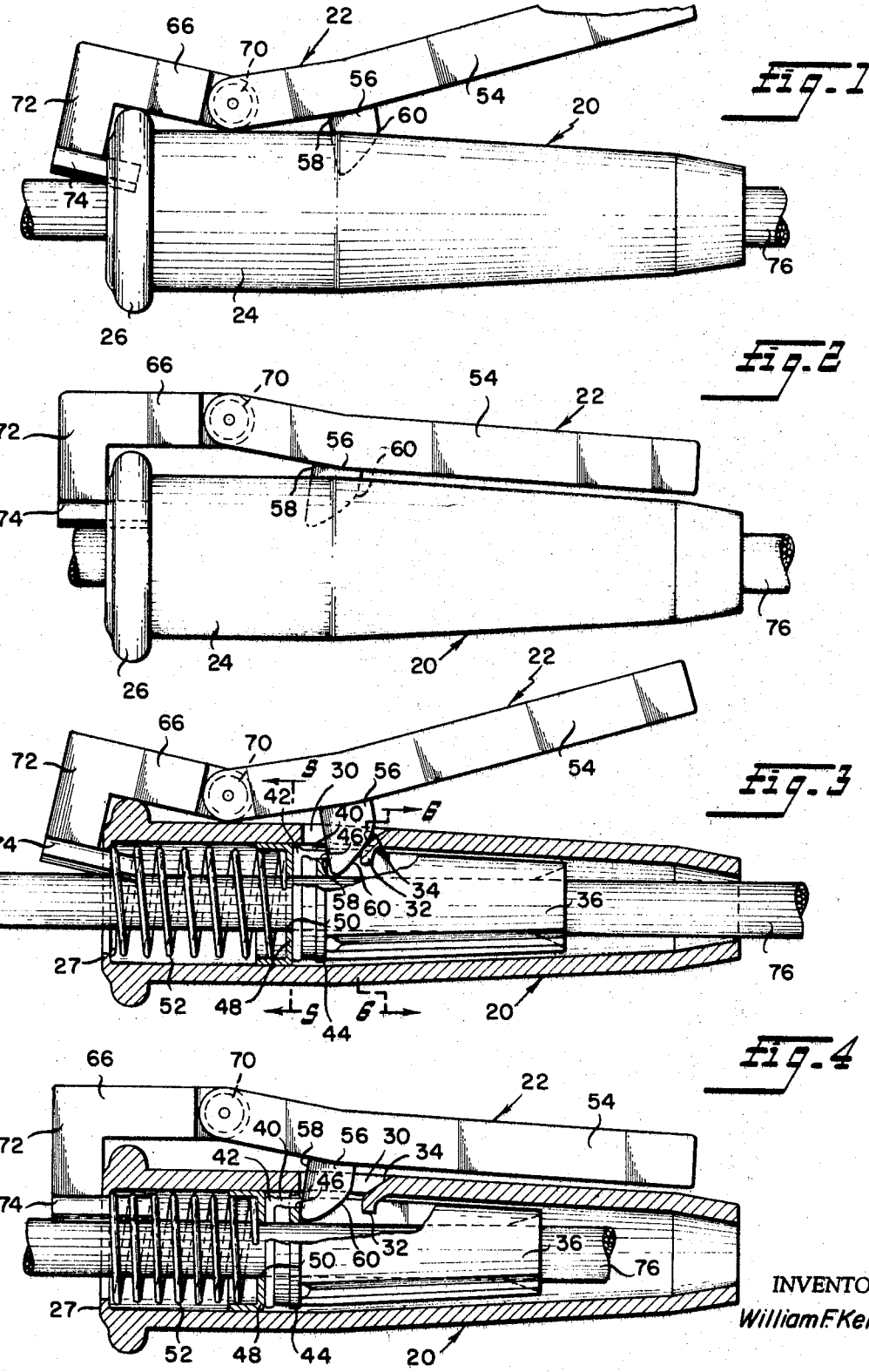
INVENTOR
William F. Kelly
BY *Schlesinger, Arenwright & Harvey*
ATTORNEYS

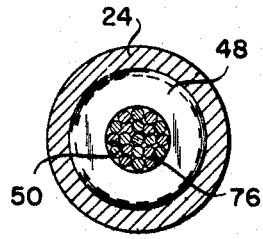
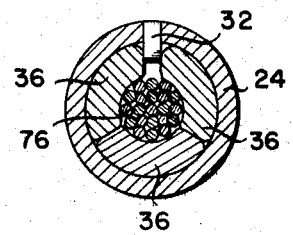
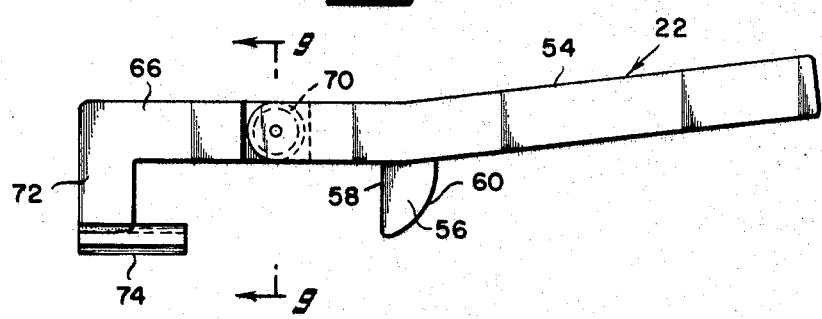
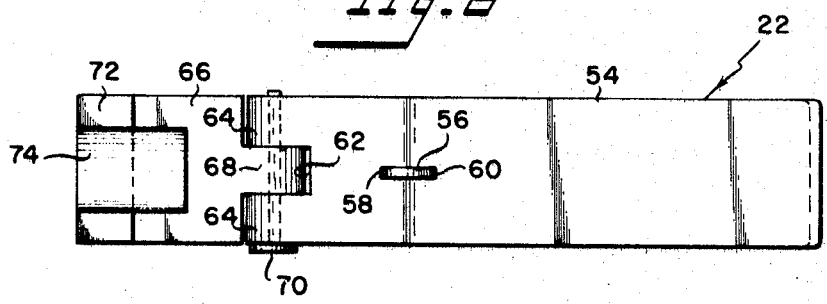
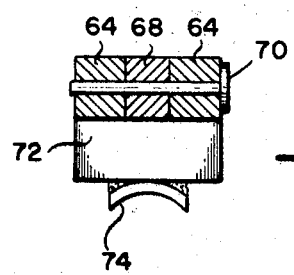

United States Patent Office 3,524,227
Patented Aug. 18, 1970

3,524,227
GRIPPING AND RELEASE ASSEMBLY
William F. Kelly, 100 Bellaire Drive,
New Orleans, La. 70124
Filed Aug. 29, 1967, Ser. No. 664,122
Int. Cl. F16g 11/04
U.S. Cl. 24—126         10 Claims

ABSTRACT OF THE DISCLOSURE

A gripping and release assembly including a tapered casing housing spring-pressed wedge segments arranged to form a bore therebetween for the reception and retention of a steel tendon inserted into the casing, a longitudinal slot in the casing between the spring and wedge segments, means for preventing rotative movement of the wedge segments relative to the casing, and a release tool for removing the tendon from the casing, the tool including an articulate arm, one terminal of which is formed to provide a hook engageable with a terminal of the casing, the tool further including a pin depending from an intermediate part of the articulate arm, the pin extending through the longitudinal slot of the casing between the spring and wedge segments.

BACKGROUND AND OBJECTS

This invention relates to a gripping and release assembly particularly adapted for use with steel tendons or like members.

In the post-tensioning of prestressed concrete in the manner set forth in my copending application Ser. No. 490,421, filed Sept. 27, 1965, now Pat. No. 3,399,434, a gripping member of the type disclosed in U.S. Pat. 2,138,913 is employed as a pretension anchor for applying a light tension to a tendon extending between concrete forms prior to pouring concrete therein. This type of gripping member embodies a tapered casing in which spring-pressed wedge segments are housed. A longitudinal slot in the casing wall permits a screwdriver or the like to be inserted between the wedge segments and the spring to compress the latter and free the tendon.

It has been found that difficulty is often experienced in releasing the tendon due primarily to the rotation of the wedge segments relative to the casing, with the result that the wedge segments block the longitudinal slot in the casing and prevent the insertion of the screwdriver therethrough to release the wedge segments on the tendon. Additionally, the use of a screwdriver is awkward, requires the exertion of considerable force on the spring and is time consuming.

It is an object of this invention to provide a gripping and release assembly for a steel tendon or the like, the assembly including a gripping member having spring-pressed wedge means for retaining a tendon therebetween, and a release tool readily engaged with the wedge means for disengaging the latter from the tendon.

Another object is to provide a gripping and release assembly including a gripping member having a tapered casing, wedge segments movably mounted within the tapered casing at the small end thereof, the wedge segments forming a central bore through which a tendon passes, a coil spring between the inner terminal of the wedge segments and a terminal of the casing, a longitudinal slot in the casing wall at the locus of the juncture of the wedge segments and coil spring, and means carried on the inner wall of the casing interposed between adjacent wedge segments to prevent rotative movement of the latter relative to the casing, but permitting longitudinal movement of the wedge segments relative to the casing.

A further object is to provide an assembly of the character described including a release tool for disengaging a tendon from the gripping member, the release tool including an articulate arm having a member mounted thereon which extends through a slot in the gripping member casing for compressing the spring therein, to disengage the tendon from the wedge segments and permit removal thereof.

A still further object is to provide a gripping and release assembly comprising a few, readily assembled parts, the assembly permitting quick, facile engagement and disengagement, with a tendon.

Other objects will be manifest from the following description of the presently preferred form of the present invention taken in conjunction with the accompanying drawings:

DESCRIPTION OF DRAWINGS

FIG. 1 is a fragmentary side elevational view of the gripping and release assembly of the present invention, showing the release member in inoperative position;

FIG. 2 is a view similar to FIG. 1, showing the release member in operative position;

FIG. 3 is a longitudinal sectional view of the assembly of FIG. 1, the release member being shown in elevation;

FIG. 4 is a sectional view similar to FIG. 3, the release member being shown in the operative position;

FIG. 5 is a sectional view taken along the line 5—5 of FIG. 3, looking in the direction of the arrows;

FIG. 6 is a sectional view taken along the line 6—6 of FIG. 3, looking in the direction of the arrows;

FIG. 7 is a side elevational view of the release member per se, a portion thereof being shown in section to disclose details of construction;

FIG. 8 is a front elevational view of the same, and

FIG. 9 is a sectional view taken along the line 9—9 of FIG. 7, looking in the direction of the arrows.

DESCRIPTION OF INVENTION

Referring now in greater detail to the drawings, in FIGS. 1 to 4, there is illustrated the assembly of the present invention which generally comprises a gripping member 20 to which is detachably connected a release tool 22.

Gripping member 20 includes a hollow casing 24 of generally cylindrical shape, one terminal of which is provided with an outer peripheral flange 26 and an inner annular abutment 27. From a point intermediate its length, casing 24 is tapered gradually to the terminal thereof remote from peripheral flange 26. The tapered casing produces a bore within the casing which also is gradually reduced from a point intermediate the length of the casing to the terminal thereof.

As shown in FIGS. 3 and 4 the wall of casing 24 is provided with a longitudinal slot 28 at a point intermediate its length, to permit access to the interior of the casing. It will be noted that at one terminal of the slot, a portion of the casing adjacent the same is struck out at 30 to provide a spacer or finger 32, for purposes which will hereinafter be more fully set out. Spacer 32 extends inwardly at an angle to provide a wall portion 34 of substantially the same width as longitudinal slot 28.

Within the tapering end of casing 24, there is provided wedge means adapted to grippingly engage a tendon or the like which is passed through the casing. The wedge means preferably include a plurality of wedge-shaped members 36 of the type disclosed in Pat. No. 2,138,913. Each wedge member 36 is slotted at the large end thereof to provide a neck portion 40 which is provided with peripheral slots 46 into which neck portion 40 of each wedge member fits.

In accordance with an object of the present invention, the wedge means forming a part of the present invention is arranged within casing 24 in such a manner that spacer or finger 32 is interposed between adjacent wedge members 36 to prevent relative rotation of the wedge members, with relative longitudinal movement thereof. (See FIGS. 3, 4, and 6.)

Adjacent the inner terminal of the wedge means is a floating cup 48 which lies in spaced relation to the large end of casing 24, cup 48 is provided with a central opening 50 through which a tendon or the like passes. A convolute spring is positioned within casing 24 between cup 48 and annular abutment 27, the spring exerting a longitudinal force on the wedge means in a well known manner.

It will be noted from FIG. 3 of the drawing that longitudinal slot 28 in casing 24 is strategically positioned at the juncture of the wedge means and the spring, spacer 32 acting to prevent one of wedge members 36 from blocking the slot.

Release tool 22 is illustrated in FIGS. 7 to 9 and comprises an articulate arm which embodies a main body portion 54 which is preferably of bar shape and is slightly bent longitudinally of its length from a point intermediate the length to one terminal thereof. A release pin 56 etxends from one face of main body portion 54, which pin preferably has a flat configuration, the forward edge of the pin being flat, and at substantially right angles to that of main body portion 54 to which it is connected, as indicated at 58. The opposite face of release pin 56 is of arcuate conformation as indicated at 60. Release pin 56 also extends coaxially of body portion 54.

One terminal of main body portion 54 is provided with a central recess 62 which forms a pair of spaced ears 64 at the terminal of main body portion 54.

Release tool 22 further includes an auxiliary body portion 66 for hinged engagement with main body portion 54. For this purpose, one terminal of auxiliary body portion 66 is provided with a central extension or ear 68 which extends into central recess 62 of main body portion 54. A hinge pin 70 extends through ears 64 and extension 68 to effect hinged engagement of the two parts.

The opposite terminal of auxiliary body portion 66 is bent to form a hook or bill 72, to the terminal of which is fixed a reversely extending lip or flange 74 which extends in substantially spaced, parallel relation to body portion 66 and in the direction of main body portion 54. Lip or flange 74 is transversely arcuate for complemental engagement with the inner periphery of one terminal of casing 24, and lies in predetermined spaced relation to release pin 56 of main body portion 54.

OPERATION

In use of the assembly of the present invention, a tendon or the like 76 is trained through casing 24 from the small end thereof, the teeth 38 of the spring-pressed wedge members engaging the outer periphery of the tendon to grip the same and prevent longitudinal movement with respect to the casing.

When it is desired to remove the tendon from casing 24, release tool 22 is engaged with gripping member 20 in the manner illustrated in FIG. 1. As shown, hook or bill 72 is placed over the larger terminal of casing 24 with lip or flange 74 in contiguous engagement with the inner periphery of annular abutment 27. At this time also, by virtue of the spaced relationship of lip or flange 74 to release pin 56, the forward, straight portion of the latter is in engagement with disk member 44 and the arcuate portion thereof is in engagement with angular wall portion 34.

At this time, the hinged portion of release tool 22 is in collapsed position and in engagement with casing 24.

Upon exertion of hand pressure in a direction to squeeze the bent section of main body portion 54 in the direction of casing 24, hinged movement of main body portion 54 with respect to auxiliary portion 66 takes place, with resultant movement of release pin 56 in the direction of the large end of the casing. This action also moves disk member 44 which holds wedge members 36 against the compression of spring 52. This releases the grip of the wedge means on the tendon and permits the latter to be withdrawn from casing 24.

With the assembly of the present invention, a gripping and release assembly is provided which includes a few readily assembled parts, of economic construction, which permits quick, facile engagement and disengagement of the assembly with a tendon.

While there has been herein shown and described the presently preferred form of the present invention, it is to be understood that such has been done for purposes of illustration only, and that various changes may be made therein within the scope of the claims hereto appended.

Having thus described my invention, what I claim is:

1. A gripping and release assembly for steel tendons or the like, including
    (a) a casing having a bore extending therethrough for the reception of a tendon,
    (b) said casing tapering from a point intermediate its length to one terminal thereof,
    (c) said casing being provided with a longitudinal slot in the wall of said casing at a point intermediate its length, a spacer finger extending from an end of said slot into said bore,
    (d) a plurality of wedge members positioned within said casing, said spacer finger being positioned between adjacent wedge members to prevent rotative movement of the latter,
    (e) each of said wedge members being provided with tendon-engaging teeth on opposed faces thereof,
    (f) a spring within said casing between one terminal thereof and a terminal of said wedge members, for exerting a force on the latter in the direction of the tapered end of said casing, and
    (g) a release member detachably engageable with said tapered casing, said release member including
    (h) an arm assembly,
    (i) release means carried by said arm and extending through the longitudinal slot of said casing,
    (j) a portion of said release means being engageable with said spacer finger,
    (k) another portion of said release means being engageable with said wedge members,
    (l) whereby, upon force being exerted by said release means against said wedge members in opposition to the force of said spring against said wedge members, the wedge members are moved in a direction opposite the tapering end of said casing, to release the grip of said wedge members on the tendon upon actuation of said release means.

2. The gripping and release assembly of claim 1, wherein
    (a) said portion of said release means is of flat configuration,
    (b) the forward edge of said release means being substantially vertical to said arm assembly,
    (c) the rear edge of said release means being curved for facility in inserting said release means through the longitudinal slot of said casing to engage the forward edge of said release means with said wedge members.

3. The gripping and release assembly of claim 1 wherein
    (a) a portion of the longitudinal slot in the wall of said casing is struck out to form said spacer finger extending inwardly into the bore of said casing.

4. The gripping and release assembly of claim 3, wherein
    (a) said means includes a hook portion for engagement over a terminal of said casing.

5. The gripping and release assembly of claim 1, wherein (a) said arm assembly includes a pair of longitudinally aligned arms, (b) the adjacent terminals of said arms being hingedly connected, and (c) a generally hook-like means issuing from the free terminal of one of said arms for engagement with the bore opening at the terminal of said casing.

6. A gripping and release assembly for steel tendons or the like, including (a) a casing having a bore extending therethrough for the reception of a tendon, (b) said casing tapering from a point intermediate its length to one terminal thereof, (c) said casing being provided with a longitudinal slot in the wall of said casing at a point intermediate its length, (d) a plurality of wedge members positioned within said casing, (e) each of said wedge members being provided with tendon-engaging teeth on opposed faces thereof, (f) a spring within said casing between one terminal thereof and a terminal of said wedge members, for exerting a force on the latter in the direction of the tapered end of said casing, and (g) a release member detachably engageable with said tapered casing, said release member including, (h) an arm assembly, (i) said arm assembly including a pair of longitudinally aligned arms, (j) the adjacent terminals of said arms being hingedly connected, (k) a generally hook-like means issuing from the face terminal of one of said arms for engagement with the bore opening at the terminal of said casing, (l) release means carried by the other of said arms and extending through the longitudinal slot of said casing, (m) a portion of said release means being engageable with the portion of the casing defining one longitudinal extremity of the longitudinal slot, (n) another portion of said release means being engageable with said wedge members, (o) whereby, upon force being exerted by said release means against said wedge members in opposition to the force of said spring against said wedge members, the wedge members are moved in a direction opposite the tapering end of said casing, to release the grip of said wedge members on the tendon upon actuation of said release means.

7. The release tool of claim 6 wherein:

(a) said release means includes a pin in the form of a flat body, (b) one edge of said body being straight, and (c) the opposite edge of said body being curvilinear.

8. The gripping member of claim 6, wherein:

(a) said casing is tapered from a point intermediate its length to one terminal thereof.

9. The gripping assembly of claim 6, wherein:

(a) said yieldable means comprises a convolute spring.

10. A gripping and release assembly for steel tendons or the like including:

(a) a casing having a bore extending therethrough for the reception of a tendon;

(b) said casing tapering from a point intermediate its length to one terminal thereof;

(c) a longitudinal slot in the wall of said casing at a point intermediate its length;

(d) a portion of said casing at one end of the longitudinal slot being struck out to form a spacer extending inwardly into the casing;

(e) a plurality of wedge members positioned within said casing;

(f) each of said wedge members being provided with tendon-engaging teeth on opposed faces thereof;

(g) said casing spacer being located between adjacent wedge members to prevent rotative movement of the latter;

(h) a spring within said casing between one terminal thereof and a terminal of said wedge members, for exerting a force on the latter in the direction of the tapered end of said casing, and (i) a release member detachably engageable with said tapered casing, said release member including (j) a pair of hingedly connected arms;

(k) a hook portion issuing from the terminal of one of said arms for engagement over one of the terminals of said casing;

(l) the release members further including a release pin extending outwardly from the other of said arms;

(m) said release pin extending through the longitudinal slot in the wall of said casing and engageable with said wedge members, for moving the latter against the force of said spring, in a direction opposite the tapering end of the casing, to release the grip of said wedge members on the tendon upon actuation of said release member.

References Cited

UNITED STATES PATENTS

| | | |
|---|---|---|
| 801,377 | 10/1905 | Hardesty _____ 24—136 |
| 1,357,576 | 11/1920 | Martet. |
| 1,494,585 | 5/1924 | Burns. |
| 1,702,359 | 2/1929 | Molmark. |
| 2,128,832 | 8/1938 | Lusher. |
| 2,158,892 | 5/1939 | Becker _____ 24—126 X |
| 2,204,979 | 6/1940 | Buchanan _____ 24—126 |
| 2,710,520 | 6/1955 | Selzler _____ 29—267 X |
| 3,378,892 | 4/1968 | Vano _____ 24—126 |

BERNARD A. GELAK, Primary Examiner

U.S. Cl. X.R.

254—131